United States Patent [19]
Geck et al.

[11] 3,953,197
[45] Apr. 27, 1976

[54] PRODUCTION OF CARBURIZED IRON

[75] Inventors: Hans Günther Geck, Hagen; Jürgen Langhammer, Bremen-Platjenwerbe, both of Germany

[73] Assignee: Klöckner-Werke AG, Duisburg, Germany

[22] Filed: May 23, 1974

[21] Appl. No.: 472,892

[30] Foreign Application Priority Data
May 25, 1973 Germany........................... 2326721

[52] U.S. Cl. ................................................. 75/48
[51] Int. Cl.² ............................................ C21C 7/00
[58] Field of Search ........... 75/48, 95; 266/43, 34 R

[56] References Cited
UNITED STATES PATENTS

| | | | |
|---|---|---|---|
| 1,674,982 | 6/1928 | Moore | 75/48 |
| 2,174,520 | 10/1939 | Kuniansky | 75/48 |
| 2,762,701 | 9/1956 | Crego et al. | 75/48 |
| 3,215,422 | 11/1965 | Golby | 75/48 |
| 3,788,837 | 1/1974 | Geck et al. | 75/43 |

FOREIGN PATENTS OR APPLICATIONS

| | | | |
|---|---|---|---|
| 14,158 | 1884 | United Kingdom | 75/95 |

OTHER PUBLICATIONS

Leitner-Plöckinger, *Die Edelstahlerzeugung*, p. 438, Springer Verlag, 1965.

*Primary Examiner*—M. J. Andrews
*Attorney, Agent, or Firm*—Michael J. Striker

[57] ABSTRACT

Particulate material such as iron scrap is melted down into a melt which is received in a melt retaining zone. During the reception of the melt in this zone, liquid iron of the melt is contacted with an elongated upright body of carbon soluble in the liquid iron, or with a lining of such carbon adherent to the bottom of the melt retaining zone, below any slag which floats on the liquid iron of the melt. The liquidus point of the melt is lowered by the resulting carburization of the iron, thereby facilitating the retention of the liquid iron in the melt retaining zone.

4 Claims, 2 Drawing Figures

PRODUCTION OF CARBURIZED IRON

BACKGROUND OF THE INVENTION

The invention relates to the carburizing of metal melted down from scrap metal, particularly steel scrap, prereduced iron sponge, pellets, and the like. The invention is particularly applicable in connection with the method described in U.S. Pat. application Ser. No. 237,158, now U.S. Pat. No. 3,788,837 issued to the present inventors. The patent describes a method of melting scrap iron comprising the steps of maintaining a charge of particulate scrap iron in an upright elongated melting chamber comprising a bottom wall; contacting a lower portion of the charge with a disc-shaped flame produced from an oxygen fuel mixture, said flame being spread transversely through said melting chamber and being arranged upwardly of said bottom wall so that the metal of said charge melts and flows onto said bottom wall thereby becoming interposed between said flame and said bottom wall and protecting the latter from the former; and continuously discharging the melted metal from said melting chamber. The flame can be injected into the charge either by a burner or the like disposed centrally of the charge or in an annular zone provided with burners or the like peripherally of said charge.

It is a difficulty of this earlier process that the liquidus point of the resulting melt is only a little below the actual temperature of the melt discharged from the melting chamber. This situation leads to the danger of freezing up and the formation of "bears", because of losses of heat which are usually unavoidable in the melt receiving and retaining zone when the melt is stored or transported therein over some extended period of time. In some cases liquid pig iron has been mixed with the melted scrap in order to lower the liquidus point by carbon contained in the pig iron, but such admixture is not always possible. Other methods of carburizing the iron are therefore desired. In other processes caburizing is achieved by dropping particulate carbon onto a melt in a melt receiving or retaining vessel. However, in the melting down of particulate iron, especially as described in the aforementioned patent, ferrous oxide slag is formed as part of the liquid iron slag, as particulate iron is melted in the presence of air. Such slag floats on the liquid iron and prevents particulate carbon from sinking into the liquid iron. The particulate carbon would float on or in the slag, would be coated thereby and sintered therein, and would not come into such direct contact with the liquid metal as is necessary for the carburizing of the metal.

SUMMARY OF THE INVENTION

It is an object of the invention to provide for the carburizing of liquid iron, melted down from particulate iron.

It is a further object to carburize the iron melt without a need for mixing the melt with pig iron or the like.

For this purpose, the melt according to the invention is contacted with a mass of carbon soluble in liquid iron, below any floating slag, during the reception of the melt in a receiving ladle. The mass of carbon is provided in form of an upright hollow cylinder or other upright elongated body, held in the receiving vessel in an arrangement similar to that of the stopper rods of ladles; or the mass of carbon is provided by a lining of carbon rammed onto the bottom wall of the meltreceiving ladle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
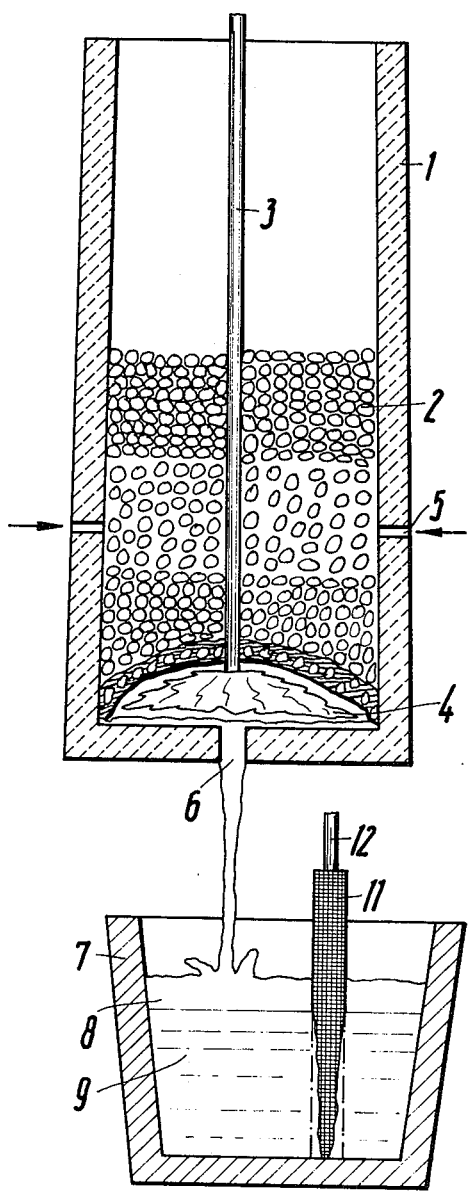
FIG. 1 is a central vertical section through a system according to the invention.

As shown in FIG. 1, the melting down of steel scrap or other particulate metal is performed in a shaft furnace 1 wherein the particulate material forms a charge in the form of a column 2. Centrally of shaft furnace 1 a burner lance 3 extends from the top to adjacent the bottom or hearth of the furnace to produce a disc-shaped flame 4 in a bottom portion of column 2. Air or oxygen can be introduced into the furnace through peripheral inlets 5 above this flame to promote the melting process by promoting combustion of waste gases and by thus preheating the particulate iron before it reaches the flame 4. The liquid melt formed in the bottom part of column 2 collects on the hearth or bottom of the furnace wherefrom it is poured off through a suitable notch or aperture 6.

Below the shaft furnace 1, which may rest on a suitable platform not shown, a ladle 7 is brought into position, for example on suitable carriage means not shown, so that the liquid melt poured from opening 6 enters the open top of a melt receiving zone in the ladle 7, which also serves as a zone retaining the melt for some length of time. Molten slag containing ferrous oxide 8 floats on the liquid iron 9 retained in ladle 7.

For the purpose of carburizing the liquid iron according to the invention, as explained above, an elongated carbon body 11 is held in ladle 7, remotely from the walls thereof, and extends into the ladle for contact with liquid iron 9, through floating slag 8. As indicated by broken lines, portions of the carbon of body 11 are dissolved in the liquid iron. When a lower end portion of the elongated body 11 has been consumed thereby, upper portions of this body can be lowered into the ladle 7. For this purpose a carbon cylinder 11 may be held on or by a central rod 12, suitably mounted by holding means not shown, in the manner of a stopper rod or the like.

Figure 2:
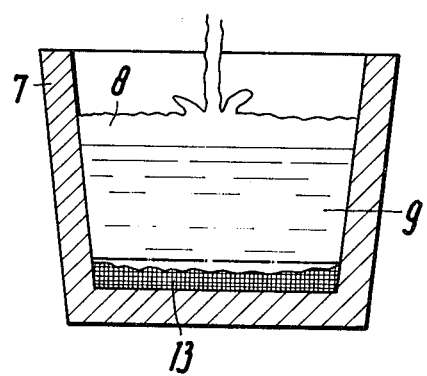
FIG. 2 is a similar section through a modified detail.

In the modification shown in FIG. 2, the ladle 7 has a bottom layer 13 of carbon soluble in the liquid iron and in surface contact therewith, this layer being gradually dissolved as indicated by broken lines and being firmly rammed into the bottom of the ladle. The carbon of this layer 13 will not float into slag 8 which would coat it and prevent its dissolution in the liquid metal.

It will be understood that each of the elements described above, or two or more together, may also find a useful application in other types of production of carburized iron differing from the types described above.

While the invention has been illustrated and described as embodied in a production of carburized iron, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process of producing carburized iron from particulate iron which forms a supernatant slag layer when melted which process comprises the following steps:
   a. melting the particulate iron in a furnace;
   b. transferring the molten iron from the melting furnace to a ladle,
   c. bringing the molten iron in the ladle into contact with carbon that is fixedly located below the supernatant slag layer for a period of time sufficient to effect a preselected degree of carburization of the molten iron, and
   d. thereafter withdrawing the thus carburized molten iron from the ladle.

2. A process as defined in claim 1 in which the carbon with which the molten iron is brought into contact is a layer of carbon fixedly located on at least a portion of the internal surface of the ladle.

3. A process as defined in claim 1 in which the carbon with which the molten iron is brought into contact is a carbon rod or hollow carbon cylinder.

4. A process as defined in claim 1 in which the particulate iron which forms a supernatant slag layer when melted is scrap iron, preliminarily reduced sponge iron, or iron pellets.

* * * * *